| United States Patent [19] | [11] Patent Number: 4,581,157 |
| Twigg | [45] Date of Patent: Apr. 8, 1986 |

[54] CATALYST AND STEAM REFORMING PROCESS

[75] Inventor: Martyn V. Twigg, Yarm, England

[73] Assignee: Imperial Chemical Industries PLC, London, England

[21] Appl. No.: 672,865

[22] Filed: Nov. 19, 1984

Related U.S. Application Data

[63] Continuation of Ser. No. 447,134, Dec. 6, 1982, abandoned.

[30] Foreign Application Priority Data

Dec. 21, 1981 [GB] United Kingdom ................ 8138389
Feb. 19, 1982 [GB] United Kingdom ................ 8204893
Oct. 12, 1982 [GB] United Kingdom ................ 8229121

[51] Int. Cl.$^4$ .............................................. C01B 3/38
[52] U.S. Cl. ................................... 252/373; 502/326

[56] References Cited

U.S. PATENT DOCUMENTS

| 3,334,055 | 8/1967 | Dowden et al. | 252/373 |
| 3,846,344 | 11/1974 | Larson, Jr. et al. | 252/477 Q |
| 3,994,831 | 11/1976 | Betz | 252/477 R |
| 4,089,941 | 5/1978 | Villemin | 252/373 |
| 4,233,187 | 11/1980 | Atwood et al. | 252/373 |
| 4,301,039 | 11/1981 | Retallick | 252/477 R |
| 4,340,501 | 7/1982 | Davidson | 252/373 |
| 4,349,450 | 9/1982 | Hunter | 252/477 R |

FOREIGN PATENT DOCUMENTS 0021736 7/1981 European Pat. Off. .
1064922 4/1967 United Kingdom .
1318732 8/1970 United Kingdom .
1319191 6/1973 United Kingdom .
2077136 6/1981 United Kingdom .

OTHER PUBLICATIONS

*Catalyst Handbook*, Springer-Verlag, New York, pp. 164–169, (1970).
Furter, W. F. et al., "Comparative Performance of Packings for Gas–Liquid Contacting Columns", *Canadian Journal of Chem. Eng.* vol. 51, Jun. 1973, pp. 326–331.
McCabe and Smith, *Unit Operations of Chemical Engineering*, McGraw-Hill, N.Y. (1956) pp. 630–631.
Chemical and Process Engineering, "Hydrocarbon Reforming Catalysts", Dec. 1966, pp. 1–5.

*Primary Examiner*—Natalie Trousof
*Assistant Examiner*—Bruce D. Gray
*Attorney, Agent, or Firm*—Cushman, Darby & Cushman

[57] ABSTRACT

A process of reacting a hydrocarbon feedstock with steam and/or carbon dioxide is carried out over a catalyst in the form of at least one undeformable hollow unit permitting gas flows in at least two mutually transverse directions within its boundaries. The catalyst typically comprises random-packed metal tubular units with apertures in their walls, such as PALL rings. The process is capable of high throughputs at low pressure drop and with low concentrations of catalytically active metal per unit catalyst bed volume as compared with conventional ceramic ring catalyst.

4 Claims, No Drawings

CATALYST AND STEAM REFORMING PROCESS

This is a continuation of application Ser. No. 447,134, filed Dec. 6, 1982, now abandoned.

This invention relates to a catalyst and to the catalytic process "steam reforming" for reacting a hydrocarbon or hydrocarbon derivative with steam and/or carbon dioxide.

This process has been carried out on an increasing industrial scale since the late 1920s as the first step in converting hydrocarbons, especially natural gas, to hydrogen, ammonia synthesis gas or carbon oxides/hydrogen synthesis gases. Usually, since the steam reforming reaction is strongly endothermic, the catalyst for it is disposed in tubular reactors heated externally in a furnace, but there have been proposals to use an alternative procedure in which the reactants are heated in the absence of catalyst and then reacted adiabatically over the catalyst, this sequence being possibly repeated at least once.

The conventional catalyst for the tubular reactor process has been in the form of ceramic "Raschig" rings about 17 mm in height and diameter and with walls typically 5 mm thick. Recently it has been proposed to increase the extent of conversion by using a catalyst having a higher geometric surface, for example in the form of rings having internal partitions (U.S. Pat. Nos. 4,089,941, 4,233,187) or of small honeycombs (our European published application No. 21736 or UK application No. 2077136 published on Dec. 16, 1981) or structures providing fluid flow alternatingly between the catalyst and the vessel walls (our published European application No. 25308). However, the EP No. 21736 shapes are not very easy to make and the EP No. 25308 shapes are not readily interchangeable with existing ceramic-supported catalyst.

It is disclosed in EP No. 21736 that the catalyst can be in the form of small metal wire helices, for example of height 5 mm, diameter 3 mm and wire thickness 0.5 mm. It is disclosed in UK No. 1319191 that the catalyst can be in the form of loosely compacted shapes, for example 25.4×25.4×12.7 mm thick, resembling (scouring pad) pillows and made of stainless steel wire 0.058 mm in diameter. Each of these shapes represents a way of attaining a greatly increased geometric surface, but they are mechanically unsatisfactory and have not been used in routine industrial operation.

We have devised a steam reforming process using a catalyst in a shape that can make a moderately increased geometric surface area more conveniently attainable but also makes very efficient operation possible with a geometric surface substantially less than has previously been thought desirable.

According to the invention a process of reacting a hydrocarbon feedstock with steam and/or carbon dioxide over a catalyst is characterised in that the catalyst is in the form of at least one undeformable hollow unit permitting through gas flows in at least two mutually transverse directions within its boundaries.

The invention provides also, per se, certain catalysts in the above-defined form and supports and precursors convertible thereto, as will be described below.

The term "undeformable" refers to the conditions likely to be encountered in the manufacture and use of the catalyst and means that each unit has a crushing resistance of at least 2 kg per unit in the direction in which it is weakest.

The expression "mutually transverse" includes but is not limited to mutually perpendicular directions of flow. In any direction within the boundaries of the unit the gas can encounter deflective or catalytic surfaces and can undergo mixing with gas flowing in another direction. Preferably each unit permits gas flows in each direction into its interior and out at the far side. The open areas for gas flow in each direction preferably do not differ by a factor of more than 10.

Very suitably the catalyst is in the general shape of a tube-shaped unit having interrupted contact surfaces. As a result, gas proceeding along the surface in any direction will at least once pass off the surface while still within the overall boundaries of the unit; preferably such gas will at least once return to a further part of the surface.

The general shape of a tube-shaped unit includes any cross-section, for example polygonal (regular or not), circular or oval. The diameter can be constant or can vary, as in a conical frustum. It also includes cross-sections amounting to more or less than a complete circle, though the cross-section should preferably no be so open as to permit extensive interlocking between units. The walls of the tube-shaped unit can be plain or corrugated axially or transversely or or diagonally, or can be embossed. The tube-shaped unit can be formed with internal full-length webs (preferably defining not more than 4 through passages) or with internal or external projections possibly not running its full length. When internal wall projections are present, the tube-shaped unit cross-section can be much less than a complete circle, for example approximately a semicircle if the projections prevent interlocking between units. In a preferred unit internal projections are present and these conveniently correspond in shape to apertures, in the wall of the tube-shaped unit providing the transverse flow and the interruptions in the contact surface. As well as affording a shape having favourable catalytic properties, such units are easily manufactured by bending and punching strip metal. Apart from the possible internal webs or inward projections, the units provide essentially unobstructed through flow. The open cross-sectional area is preferably at least 40, especially over 80, for example 85–95%.

The apertures should preferably be at least 10 times, e.g. 20–50 times, as large as the depth of the laminar sublayer that will be present during operation of the process for which the catalyst is to be used. Apertures of such a size ensure that gas can flow freely through and mix. Thus for a steam reforming catalyst to be used at a pressure of 30 bar abs. the apertures would be at least 1, preferably in the range 2–5 mm wide in their smallest dimension. Naturally, the apertures should not be so large as to weaken the unit excessively: typically they amount to between 20 and 60% of the wall area.

The external shape of the units is preferably a right cylinder. The units over-all have a height preferably more than 40% of their diameter but not over twice their diameter. As a result of the apertures in their walls there is no need to limit the height of the cylinders in the manner proposed for ceramic steam reforming catalysts.

The shapes include units already proposed as packing for vapour/liquid contacting but such shapes do not appear to have been previously proposed as catalyst supports, certainly not for steam hydrocarbon reforming. Since such shapes can have a geometric surface little higher than that of plain hollow cylinders of the same over-all size, we believe it is surprising that they should have advantages.

The following are examples of preferred unit shapes:

(a) "PALL" rings. These are hollow cylinders preferably formed of sheet metal or alloy. The cylinder wall is formed with at least one co-planar set of apertures of rectangular shape, but each rectangle is punched out on two transverse and one axial direction, leaving a vane which is then bent inwards from its remaining axially directed side. Usually each hollow cylinder is made by rolling-up a length of punched strip metal without uniting the extremities of each length together;

(b) "HY-PAK" rings (Registered Trade Mark). These are similar to "PALL" rings except that each rectangular aperture is formed by punching out two narrow vanes one attached at each end of the rectangle: then each vane is bent inwards. Each vane may itself have a tongue punched out and projecting from it, as in U.S. Pat. No. Re. 27,217. The "HY-PAK" ring provides shorter contact surfaces on the vanes in the axial direction than the "PALL" ring and may be advantageous for reactions in which the heat effect is very high, such that the reactants must spend only a short time in contact with the catalyst before mixing with other reactant and receiving or giving up heat;

(c) "INTALOX" packing (Registered Trade Mark). Like "PALL" and "HY-PAK" rings, these units each consist of a hollow tube with apertured walls and internal vanes. However the tube is of approximately a bridged "U" in section. "INTALOX" provides more free space in a vessel charged with it than either "PALL" or "HY-PAK" and may be advantageous when the heat effect is still higher;

(d) "Saddle" units, especially those based on semicircles with radial fingers;

(e) Modified forms of (a) to (d) to suit the requirements of catalysis, instead of vapour/liquid contacting for which they have been designed. Among the modifications are (i) smaller over-all size. Since 17×17 mm "PALL" rings have only 25–30% of the pressure drop of commercial steam reforming catalyst, yet no less activity, it will evidently be possible to increase the activity and thus output of a charge of catalyst by using smaller units. Typically units having height or diameter in the range 5–15 mm are likely to be useful, in addition to the 15–50 mm units already available;

(ii) units of oval cross-section, such as flattened "PALL" or "HY-PAK" rings;

(f) Perforated tube-shaped units without internal projections. To increase their geometric surface each such unit has an internal web providing preferably 2 through passages of semicircular cross-section, as in a so-called "LESSING" ring;

(g) As a modification of the invention, a process using unperforated webbed tubular units is described below.

In a particular catalyst bed units of two or more shapes or sizes can be used, to suit differing conditions in portions of the bed.

The two or three-dimensional gas flow through the units has one or more of the following valuable effects:

(a) compared with conventional rings and recently proposed multi-hole rings there is less resistance to gas flow through the catalyst from the inlet to the outlet of the bed. The voidage of a bed of such catalyst is typically over 70%, especially over 85%, and proportionally the local residence time of the gas in a unit is increased and its linear velocity decreased;

(b) decreased resistance to flow through the bed is accompanied by decreased resistance to flow across the bed, and therefore the reactants can flow more freely to and from the heated bed walls and can be more quickly reheated after they have undergone endothermic reaction at the surface of the catalyst;

(c) since there are apertures in each unit in at least two directions, reactant gas passes along catalytic surfaces for only short periods before leaving it and becoming reheated by mixing with hot gas within the boundaries of the unit. Thus also the local gas flow velocity along the catalytic surface can remain high; and (d) since gas can flow in two or more mutually transverse directions, so also can radiation; consequently the need for a limited height to internal diameter ratio in units providing only one direction of gas flow and thus of radiation entry is no longer present. This effect corresponds to a definition of the units as "windowed" units.

The over-all result is a new balance between heat transfer rate and local catalytic activity. Instead of using a high geometric surface of inefficiently heated low activity catalyst, it is now possible to use a relatively low geometric surface of efficiently heated high activity catalyst.

The units can be made structurally of any material that will withstand the conditions in which the catalyst is to be used. This could be an oxidic, nitridic or carbidic refractory material but, for ease of manufacture especially with thin walls, a metal or alloy is preferable. The thickness of the metal or alloy is typically in the range 0.1 to 0.5 mm for the generality of units according to the invention, but can be greater, for example up to 2 mm or even 5 mm for units having interrupted contact surfaces.

If the units are made of a metal or alloy, this can be for example titanium, zirconium and their alloys containing up to 10% other metals.

Preferably the material comprises iron and at least one other metal capable of forming an oxide layer effective to inhibit corrosion of iron. For processes at temperatures up to 750° C. stainless steels, including ferritic steels, containing at least 12% of chromium (such as defined in ASTM specification 430) are generally suitable. For processes at up to 850° C. it is preferred to use an austenitic stainless steel containing 16–20% of nickel and also minor constituents such as titanium or molybdenum, for example as defined in ASTM specifications 304, 316 and 321. For the generality of processes, including especially the steam hydrocarbon reaction at up to 1000° C., the preferred material is a high temperature alloy containing over 18 especially 20–30% of chromium, 15–40% of nickel, balance minor constituents and iron. Such alloys commonly have an austenitic structure. One example is "alloy 800H", also known as INCOLOY (RTM) 800H and as UNS N-08810, as defined in ASTM specification 8407-77, the composition % of which is Ni: 30–35
Cr: 19–23
Fe: at least 39.5 (by difference)

Mn: not over 1.5
C: 0.05–0.10
Cu: not over 0.75
Si: 1.0
S: not over 0.015
Al: 0.15–0.60
Ti: 0.15–0.60

Another is alloy 800 (UNS N-08810), defined in the same specification, which may contain less carbon. Yet another is "INCOLOY DS" (RTM) which has the % composition 18 Cr, 37 Ni, 1.5–2.5 Si, not over 0.15 C.

If desired, an alloy of still higher nickel content, including those containing over 70% of Ni, balance minor constituents and chromium, such as NICHROME or INCONEL (RTMs) can be used, but for most purposes are considered too expensive.

Further alloys that can be used, but which show somewhat inferior mechanical strength in the most severe conditions encountered in the process of the invention, are those containing 0.5 to 12% of aluminium and 0.01 to 3% of yttrium, and possibly up to 25% of chromium. These alloys include those developed for oxidative conditions at high temperature encountered in the nuclear power industry.

Examples of useful alloys are the following:

TABLE 1

| Aluminium | Chromium | Yttrium | Others | Iron |
| --- | --- | --- | --- | --- |
| 0.5 to 12 | up to 20 | 0.1 to 3 | — | balance |
| 0.5 to 12 | 5 to 15 | 0.1 to 3 | — | balance |
| 4 to 6 | 5 to 15 | 0.1 to 3 | — | balance |
| 4 to 12 | 20 to 25 | 0.1 to 3 | — | balance |
| 4 to 5.5 | 20 to 25 | 0.1 to 0.5 | — | balance |
| 2 to 12 | 10 to 25 | 0.01 to 0.1 | — | balance |
| 4 to 5.5 | 15 to 22 | 0.01 to 0.1 | — | balance |
| 4.5 | 22.5 | — | 2.0 Co 0.1 C | balance |

The support alloy may contain, in substitution for part of the iron balance up to 5.0, for example up to 3.0% of nickel and/or cobalt. Although such nickel and/or cobalt may exert some catalytic effect, nickel and/or cobalt specified in the definition of the catalyst is additional thereto.

Among the usable alloys are the steels available under the trade names FECRALLOY and KANTHAL (both RTM).

The presence of chromium, aluminium or silicon or more than one of these leads to the formation at the metal surface of an oxide layer. This is believed to account for their property of bonding oxidic catalyst support material, especially alumina, at their surface, and preferably the metal units are further oxidised, for example by heating in air at 400°–900° C. before applying such material. In addition they are characterised by high creep strength and high resistance to oxidation and carburisation, both of which properties are very desirable in a material intended to withstand the conditions prevailing in the steam/hydrocarbon reaction.

It will be appreciated that, since a catalyst support is to be fabricated from metal or alloy of thin gauge, the alloys to be used are those within the above definitions that are available in wrought form.

It is also possible to use a metal or alloy that is not itself resistant to the reaction conditions but has been rendered resistant by a coating, for example of an oxide such as ceria. Suitable alloys are low chromium steels (up to 11% Cr), possibly containing molybdenum (0.5 to 1.5% w/w).

Catalyst units made of metal or alloy have the advantage over ceramic units that they do not break when the vessel containing them is cooled from its operating temperature to room temperature. This is partly because the metal or alloy is not brittle, partly because it can have a coefficient of thermal expansion similar to that of the vessel. When the unit is a split cylinder (such as a, b, e(i), e(ii), f or g above) it typically has a crush strength of 50–150 kg cm$^{-2}$ in the axial direction and 4–6 kg per linear cm in the equatorial direction, the strength being slightly higher in the direction closing the split. These equatorial crush strengths are derived from a test in which the unit is squeezed to a smaller diameter (typical 20% smaller) beyond which further crushing requires a substantially greater pressure.

The bulk density of the catalyst units is typically in the range 0.2–0.7 g cm$^{-3}$.

The catalyst unit can itself be a catalyst in virtue of the choice of material of construction or of chemical or physical modification of its surface for example by cold-rolling of a nickel-containing unit. More commonly it is a support for active material, for example one or more metals from Group VIII of the Periodic Table. Especially when the support has a very low adsorptive surface, for example when it is a highly calcined refractory or a metal alloy, it (as "primary support") carries a coating of adsorptive material ("secondary support") and the active material is associated with that layer. Preferably the Group VIII metal content, if non-noble, is in the range 30–60% w/w calculated as equivalent NiO on the total coating. Such adsorptive material typically has a pore volume over 0.2 cm$^3$ g$^{-1}$ and a surface area of at lest 1.0, preferably over 15, especially in the range 50–200 m$^2$ g$^{-1}$. The secondary support preferably has a thickness in the range 0.01 to 0.3, especially 0.02 to 0.1 and conveniently amounts to 1–20%, especially 2–10% w/w, of the primary support. Preferably it is present on the outer and inner surfaces of the hollow units.

The unit carrying such an adsorptive layer is of general utility as a catalyst support. In converting such a support or layer-free units to a catalyst one method is to apply to it a compound, such as a metal oxide, that is not itself a catalyst but which requires further chemical treatment, for example reduction to a lower oxide or to metal to produce active catalyst. The support carrying such a compound is a catalyst precursor according to the invention.

The secondary support can comprise any oxidic material known as a support for the reaction to be carried out. Typically it comprises alumina, particularly gamma—or eta-alumina. Other sesquioxides, for example, chromia and rare earth oxides may take up at least part of the secondary support. Other useful secondary support oxides are titania, zirconia, hafnia, thoria, vanadia, ureania, oxides of manganese, molybdenum and tungsten and combined oxides.

Preferably the secondary support includes a grain growth inhibitor, for example at least 0.05, especially 0.1 to 5.0% by weight of yttrium or of one or more rare earth oxides, especially of cerium, or praseodymium.

When nickel and/or cobalt are present in the catalyst, it is expected that the secondary support, if it contains a sesquioxide, will include, at least after a period of process operation, some nickel and/or cobalt spinel. It is within the invention to have the secondary support material at least partly in the form of spinel, whether of nickel and/or cobalt or of a divalent metal having a difficultly reducible oxide, especially magnesium or manganese or, less preferably, zinc. Since nickel and/or cobalt present as spinel is in a reduction-resistant oxidic form, it does not contribute significantly to the activity of the catalyst: active nickel and/or cobalt are additional thereto.

In a catalyst comprising nickel and/or cobalt there may also be present one or more platinum group metals, which are capable of increasing the activity of the nickel and/or cobalt and of decreasing the tendency to carbon lay-down when reacting steam with hydrocarbons higher than methane. The concentration of such platinum group metal is typically in the range 0.0005 to 0.1% as metal, calculated as the whole catalyst unit. Further, the catalyst, especially in preferred forms, can contain a platinum group metal but no non-noble catalytic component. Such a catalyst is more suitable for the hydrocarbon steam reforming reaction than one containing a platinum group metal on a conventional support because a greater fraction of the active metal is accessible to the reacting gas. A typical content of platinum group metal when used alone is in the range 0.0005 to 0.5% w/w as metal, calculated on the whole catalytic unit.

For the hydrocarbon steam reforming reaction the catalyst contains (calculated as monoxide) typically 0.2 to 35, especially 1 to 25% w/w of nickel and/or cobalt. Within this range 0.5 to 12%, especially 1 to 6 or even 1 to 4% w/w is preferred. Because the catalyst units can provide a bed of lower bulk density, the quantity of active material in a given bed is lower than that of conventional catalyst by a further factor.

The specific surface of the catalytic metal is suitably in the range 0.1 to 50 m$^2$/g of catalyst. Within these ranges the larger areas are preferred for reactions under 600° C.

When both non-noble and noble metals are present a useful level of catalytic activity can be obtained using a notably small concentration of such metals, namely under 2% w/w in all, calculated on the total of secondary support and such metals. Since the secondary support constitutes typically 0.5 to 25, especially 1 to 10, % w/w of the total catalyst, the quantity of the active metals required to charge a catalyst bed is very small, especially at the preferred level of 0.01 to 0.5% w/w of such metals in total in the secondary support. The preferred noble metal is rhodium.

The catalyst can be made by applying a compound of the active metal and the secondary support together in the primary support. In a preferred method the secondary support is applied to the primary support, the combination is preferably calcined, and then a solution containing a thermally decomposable compound of active metal is applied. In order to obtain a large enough content of active metal, several applications of such a solution, each followed by drying and thermal decomposition, may be made. Oxides can be produced in situ in the secondary support by oxidation of powdered metal or thermal decomposition of an oxy salt such as a nitrate. Other methods, such as deposition from the vapour phase can be used.

A preferred method of making the catalyst comprises forming a colloidal dispersion of the secondary support material, for example by acid-peptisation and preferably also de-ionisation, suspending further support material in the dispersion, applying the suspension to the primary support and calcining it to effect adhesion and adjust surface area of the secondary support. Any grain growth inhibitor is preferably added with the dispersion or suspension. The suspension can be caused to gel before calcination. It may, if desired, contain a soluble surfactant or polymer.

The method involving thermal decomposition of an oxy salt has also given excellent results and is especially preferred when a grain growth inhibiting oxide is to be present, apparently because the secondary support oxide and inhibiting oxide are deposited together.

To improve adhesion of the secondary support to the primary support the external surface of the primary support can be oxidised or modified to increase its adsorptive area by mechanical abrasion or etching.

Normally these applications and calcinations are carried out after the primary support has been shaped. When, however, the primary support is made of metal or alloy it is possible to carry out some or all of them before one or more of the steps involved in shaping.

In the process of the invention the hydrocarbon can have a boiling point up to 220° C. for example and preferably is normally gaseous. The (steam+$CO_2$) to carbon molar ratio is typically in the range 2.0 to 8.0 for making synthesis gas or hydrogen or down to 1.0 for making reducing gas. The temperature at the catalyst outlet is typically in the range 600°–1050° C., especially 700°–1000° C. The pressure is typically in the range 1 to 50 bar abs.

When the higher temperatures mentioned are used the product gas contains at least 30% v/v of hydrogen on a dry basis and preferably less than 30, especially less than 10, % v/v of methane on a dry basis. The reaction is net-endothermic and is carried out either in externally heated tubular reactors (preferably as detailed below) or by preheating the reactants and passing them over the catalyst in an adiabatic bed: in the latter event several stages can be used, and the preferred hydrogen and methane contents relate to the outlet of the last stage.

Three forms of the steam reforming process are preferred.

I. The catalyst is in random-packed form and the units are of such a size and configuration that the pressure drop through the bed is less than 60, especially in the range 10–40, % of that of the above-mentioned conventional ceramic rings. This is especially suitable for processes in which the catalyst is disposed in an externally heated tubular reactor.

The geometric surface area of the catalyst in this form is typically in the range 100–1000 m$^{-1}$, that is, m$^2$ per m$^3$ of catalyst-filled reactor space. This is to be compared with about 300 m$^{-1}$ for the conventional ceramic rings. When the geometric surface of the catalyst according to the invention is in the convenient range 200–400 m$^{-1}$, the process is operated preferably at a mass throughout at least 10%, preferably at least 20%, higher than the maximum practicable using the conventional catalyst. The upper limit is not yet known but is believed to be about 100% above conventional. Such increased mass throughput levels assume that other conditions, namely temperature, a steam-to-carbon molar ratio and outlet methane content are kept constant. It is equally practicable, if the reaction is not taken to equilibrium, to exploit the higher effective activity of the catalyst by decreasing the temperature or the steam ratio or the outlet methane content or more than one of these, while increasing the throughput of hydrocarbon feedstock to a less extent or possibly not at all. If the plant permits such a modification, the pressure can be increased without increasing the outlet methane content.

The invention provides, as preferred examples of form I, a method of increasing the output of a hydrocarbon steam reforming process by charging to the reformer tubular reactors a catalyst as herein defined in place of a catalyst in the form of ceramic hollow cylinders. In particular, it provides steam reforming processes in the following conditions for making synthesis gas for ammonia or methanol:

|  | ammonia | methanol |
|---|---|---|
| outlet temperature, °C. | 700–850 | 780–900 |
| outlet pressure, bar abs. | 25–40 | 10–30 |
| steam to carbon molar ratio | 3.3–4.5 | 3–6 (incl. any $CO_2$) |
| outlet methane content % v/v (dry basis) | 8–16 | up to 5 |
| approach to equilibrium °C. | up to 20 | up to 10 |
| mass throughput (t $h^{-1}$ $m^3$ of heated catalyst) | over 5.0 | over 1.5 |

To give ammonia synthesis gas the product gas is then reacted with air at a rate controlled to decrease the methane content to less than 2, especially less than 1% v/v on a dry basis and to produce a ratio of equivalent hydrogen to nitrogen in the ratio 2.5 to 3.1. To give methanol synthesis gas, the product gas is cooled and excess steam condensed out.

II. The catalyst is in the form of random-packed units smaller than the conventional ceramic rings in at least one dimension, corresponding to a pressure drop between 60% and 150%, preferably 60–90%, of that of such conventional rings. Such a catalyst provides substantially more geometric surface than the preceding embodiment (typically double) and is desirable when the reaction is to take place at relatively low outlet temperatures, for example in the range 550°–700° C., so that the heat intake is relatively small and the catalyst activity relatively low. It is especially useful thus in a so-called "chemical preheater" used upstream of a conventional tubular reformer. It is also useful in a reformer system in which the reactants are heated in the absence of catalyst and then passed through an adiabatic catalyst bed, because it facilitates local reheating of partly reacted gas by mixing with hot gas that has not yet reacted, as well as providing high geometric surface without excessive pressure drop.

III. An ordered catalyst is present in the form of at least one windowed tubular unit disposed with its axis approximately parallel to the axis of a heated tubular reactor. In principle a single tube-shaped unit could be present but it is more convenient to have a plurality of such units stacked end-to-end. Such tube-shaped unit or units preferably has catalytic surfaces within it additional to its own inner walls. These can be on the surface of smaller units that can be of the same general shape as the outer units and disposed on a parallel axis or co-axially. They can be on chordal or diametral webs. Very conveniently they are turned-in flaps corresponding to the windows. If desired there can be an axial inner rod or tube; when an inner tube is present it can be a further source of heat, as in the so-called field-tube or bayonet tube process in which the reactants pass downwardly through catalyst in the space between two co-axial tubes the outer of which is closed at the bottom and then return upwardly through the inner tube losing heat through the walls of the inner tube to the reactants passing through the catalyst.

The geometric surface of the catalyst of this form of the invention is typically in the range 40–160 $m^{-1}$.

The pressure drop of this third embodiment can be extremely low, especially in the extreme case in which the catalytic surfaces lie substantially parallel to the general reactant flow direction. A typical value is in the range 0.1 to 2.0% of that the conventional rings.

To provide catalytic activity balanced with the heat and mass transfer properties due to the shape of the catalyst units, the catalyst support material typically provides between 5 and $200 \times 10^5$ $m^2$ of internal surface per $m^3$ of catalyst-filled reactor space. This can be provided by means of a layer constituting 1–20% of an oxide having an internal surface area of 100–200 $m^2$ $g^{-1}$. A suitable content of nickel and/or cobalt per $m^3$ of reactor catalyst filled space is in the range 1–100, especially 2–20, kg, calculated as monoxide. The content of platinum group metal is typically one hundredth of this when used without nickel or cobalt; rhodium is the preferred metal. If the catalyst contains both (a) nickel and/or cobalt and (b) a platinum group metal at low concentrations, as described above this corresponds typically to 0.1 to 10 kg each of of each type of metal per $m^3$ of reactor catalyst filled space.

The process can be operated in any type of reformer, for example in a top-fired, side-fired or bottom fired furnace or heated by non-radiant hot gases such as secondary reformer gas or nuclear reactor coolant gas. The catalyst as defined can form the whole of the bed or can be used in conjunction with other types of catalyst for example ceramic-supported catalyst in a region (if any) where the temperature and heat flux especially high or lightly alkalised ceramic-supported catalyst at the inlet region of the bed if carbon by-product formation is to be expected. The process is expected to lengthen the life of reformer tubular reactors by decreasing tubeskin temperatures. Since the activity of the catalyst at temperature in the range 500°–650° C. can be higher and more constant than that of conventional ceramic supported catalysts, it will be possible to operate with less incidence of "hot-banding".

At further embodiments the invention includes the following:

(a) A catalyst support in the form of an undeformable unit permitting gas flow in at least two mutually transverse directions within its boundaries and carrying a washcoat of catalyst support material;

(b) A catalyst support in the general form of a tube-shaped unit having apertures in its walls and internal projections corresponding in shape to the tube wall apertures, said walls and partitions carrying a layer of catalyst support material;

(c) A catalyst precursor comprising either such catalyst support and at least one Group VIII metal compound, and convertible to active catalyst by reduction;

(d) A catalyst comprising a support as defined in (a) or (b) and at least one active metal from Group VIII of the Periodic Table.

In each of these embodiments preferred forms are as defined hereinbefore in relation to the steam reforming process. Furthermore, the catalyst can contain active metal stabilised by superficial oxidation or can be in a condition requiring regeneration or in course of regeneration.

According to a modification of the invention a process of reacting a hydrocarbon feedstock with steam and/or carbon dioxide over a catalyst is characterised in that the catalyst is in the form of random-packed alloy tube-shaped units each having an open cross sectional area of at least 40% but permitting substantially no gas flow through its walls transverse to the flow axial thereof.

Such tube-shaped units can be formed with internal full-length webs, preferably defining not more than 4 full passages, more especially 2, as in "LESSING" rings. Their open area is especially over 70%, for example up to 85%. For efficient access of reactants in the steam reforming process the height of these units is preferably not greater than their outer diameter.

Other characteristics, such as the composition of primary and secondary support material and the nature of active catalytic material are as described hereinbefore for catalyst units permitting mutually transverse gas flows.

The invention provides the analogously modified catalyst, precursor and support.

The following Examples 1–7 illustrate the invention on the basis of tests of "PALL" rings having the following properties:

Material: Type 304 stainless steel, thickness 28SWG (thickness 0.3 mm).
Cylinder (split): height and diameter 16 mm. weight 2.8 g each. geometric surface 16 cm$^2$ per ring 326 m$^2$ per m$^3$. apertures 2 rows of 5, each 6×4 mm internal tongues: corresponding to apertures.
Bulk density: 0.5 g cm$^{-3}$
Voidage: 93%

Thereafter Example 8 illustrates modification of the invention using "LESSING" rings having these properties:

Material: Type 304 stainless steel, thickness 1.4 mm.
Cylinder: height 12.9 mm. outer diameter 13.3 mm. geometric surface 7.1 cm$^2$ per ring, 494 m$^2$ per m$^3$ a single full-height diametral web.
Bulk density: 2.06 g cm$^{-3}$ (see note in Example)

EXAMPLE 1

Effect of interrupted contact surface: nickel catlyst (a) On pressure drop

Three samples were tested by charging them to a vessel 9.2 cm in diameter, 27.5 cm in depth (volume 1.83 l), passing through the vessel a current of air at 20 m$^3$ h$^{-1}$ and measuring the difference between the inlet and outlet pressures. The three samples were:
A: "PALL" rings as described above;
B: similar rings but with the internal tongues bent back so as to close the apertures;
C: commercially available steam reforming catalyst in rings 17×17 mm, 5 mm wall thickness The incurred pressure drops in mm of water were as follows:
A: 4.5–5.0
B: 7.5–8.0
C: 15–16

Thus the effect of the apertures is to decrease pressure drop by almost 50%, to a level only a quarter that of commercial catalyst.

(b) On catalytic activity

From rings A and B catalysts A and B were made as follows:

Pretreatment: degreasing by washing with acetone and drying; superficial oxidation by heating in air at 550° C. for 4 hours.
Coating: a washcoat composition consisting of these materials was used:
Böhmite (BACO Cerasol-RTM): 225 g
Alpha alumina trihydrate (Ramsden RC66): 450 g
cerous nitrate hexahydrate: 1.65 g
"NATRASOL" RTM hydroxyethyl cellulose: 15 g
Water: 1500 g Note: the böhmite had these properties:
Composition:
$Al_2O_3$: 83
$H_2O$: 16
$Na_2O$: 0.2
$SiO_2$: 0.01
$Fe_2O_3$: 0.02
Crystallite size: about 80 Angstrom units
Crystal structure böhmite
Helium density: 2.78 g ml$^{-1}$
Hg density 1.56 g ml$^{-1}$
pore volume: 0.28 ml g$^{-1}$ The composition was made up by dissolving the hydroxyethyl cellulose in half the water, dispersing the böhmite in the other half by means of a high-shear mixer, mixing the resulting two liquids, then stirring in the trihydrate and a concentrated solution of the cerous nitrate.

The pre-treated rings were dipped in the composition for 20 minutes, allowed to drain for 30 minutes, dried at 50° C. and calcined at 700° C. for 1 hour. These operations were repeated twice. The % weight increase was: A 4.1, B 6.0. (The larger increase in B is attributed to retention of alumina in the narrow spaces between the bent-back tongues and the ring walls, but such alumina is weakly held and much of it, including nickel oxide—see below—was removed mechanically before charging the rings to the test reactor). Rings A and B constitute a catalyst support according to the invention.

Impregnation: the alumina-coated rings were dipped in a nickel nitrate solution (20 g Ni per 100 ml) for 20 minutes, allowed to drain for 20 minutes, dried at 80° C. and then calcined at 475° C. for 6 hours. These operations were repeated 3 times. The % weight increase due to NiO was: A 2.7, B 3.0. Rings A and B constitute a catalyst precursor according to the invention.

The catalyst precursors were tested as follows.

Steam-methane reforming

A 500 ml charge of each catalyst precursor was placed in a 250 mm long 50 mm internal diameter tubular reactor equipped for external electric heating. A preheated (400° C.) mixture of desulphurised natural gas (vol % 91 CH$_4$, 3.5 C$_2$H$_6$, 2 N$_2$) and steam (ratio 1:3) was passed through at a volume space velocity of 2000 h$^{-1}$, atmospheric pressure. The catalyst temperature was adjusted to successive levels between 605° and 760° C. Although the catalyst precursor was not reduced before feeding methane and steam to it, its activity developed rapidly and resulted in raw hydrogen streams containing also carbon oxides and nitrogen, and having unreacted methane contents as shown in Table 2.

TABLE 2

| Catalyst | Temperature | Methane content % v/v (dry basis) | |
|---|---|---|---|
| | | This catalyst | Equilibrium |
| A | 605 | 12.9 | |
| B | 617 | 9.7 | |
| B | 650 | 6.0 | 2.2 |
| A | 660 | 6.4 | |
| A | 700 | 2.7 | 0.7 |
| B | 700 | 3.0 | 0.7 |
| A | 760 | 1.4 | 0.2 |
| B | 760 | 1.7 | 0.2 |

Thus the two catalysts are substantially equal in activity; although in this respect they differ little from commercially available catalyst, this result is achieved with a substantially lower pressure drop.

Mechanical stability in steam

Each catalyst after the above test was steamed at 760° C. for 16 hours, then cooled and examined. There was no substantially visible loss of coating from the alloy surfaces.

EXAMPLE 2

Rhodium-nickel catalyst (D)

The preparation of catalyst precursor A was repeated on a larger scale (120 kg of trihydrate), giving 5.3% w/w of $Al_2O_3$ and 5.5% w/w of NiO, and then impregnated with 1% w/w rhodium nitrate solution and dried. The rhodium content was 0.03% w/w.

In a laboratory test as described in Example 1 the percentage methane conversions were as shown in Table 3:

TABLE 3

| Temperature °C. | Methane conversion % | |
|---|---|---|
| | initially | after 16 h steaming |
| 550 | 81 | 80 |
| 650 | 94 | 93 |
| 760 | 99 | 99 |

The catalyst precursor was then tested in one tubular reactor of a radiatively heated reformer producing methanol synthesis gas in the following conditions:
Pressure, bar abs.: 11.9
Steam ratio by mols: 4.5
Outlet temperature, °C.: 790

After 13 day's operation the flow rates and outlet gas composition from the tubular reactor charged with the above catalyst were compared with the average for the other tubular reactors of the reformer, which contained commercially available catalyst C mentioned above. The results are shown in Table 4.

TABLE 4

| | This catalyst (D) | Commercial catalyst |
|---|---|---|
| Total outlet flow rate $m^3 h^{-1}$ | 208* | 199 |
| Outlet % methane, dry basis v/v | 2.0 | 2.6–3.7 |

*Controlled at this level by flow restriction.

It is evident that, despite the rather higher flow rate, the new catalyst D provides a lower methane content in the outlet gas, and thus would make possible a much greater total throughput from the reformer if used in all tubular reactors. The tubeskin temperature was 10° C. lower than that of the tubular reactors containing ceramic catalyst.

EXAMPLE 3

Catalyst of very low precious metal content

Samples of catalyst support from Example 2 carrying the alumina coating but without nickel oxide, were impregnated with rhodium nitrate solution to give 0.3% w/w of Rh (catalyst E) and 0.006% w/w of Rh (catalyst F), then calcined at 200° C. for 2 h: These were tested as described in Example 1 and the results, express as % v/v outlet methane contents, are shown in Table 5.

TABLE 5

| Temperature °C. | Catalyst | | | | |
|---|---|---|---|---|---|
| | E | | F | | |
| | initial | steamed | initial | steamed | twice steamed |
| 500 | 39 | 39 | NA | NA | NA |
| 550 | 24 | 28 | 38* | 32 | 33 |
| 600 | 13 | 16 | NA | NA | NA |
| 650 | 6.3 | 8 | 40 | 9.7 | 9.5 |
| 700 | 2.7 | 3.0 | NA | NA | NA |
| 760 | 1.0 | 1.1 | 28 | 4.0 | 2.7 |

*Temperature in fact 545° C.
at 760° C. for 16 hours. The second steaming of catalyst F followed the activity test after the first steaming.

Despite the very low active metal content, these catalysts have substantial activity which, for catalyst F, is preferably developed by steaming.

In other experiments it was shown that these catalysts are active at 400° C. and that a catalyst (G) containing 0.0006% w/w (6 ppm) of Rh had useful activity.

The percentages quoted relate to the whole catalyst: the rhodium contents % w/w as a proportion of the alumina layer are approximately: E 6.0, F 0.12 and G 0.012. The alloy support has thus made possible a catalyst containing a potentially economic proportion of rhodium, yet disposing it where it can exert a usable level of activity.

EXAMPLE 4

(a) Alumina-coated "PALL" rings were made as in Example 1. Coating and calcining were repeated twice, giving a 5.3% weight increase (5% $Al_2O_3$ on the total of rings and coating).

Four samples (H, I, J, K) of coated rings were impregnated with weak solutions of rhodium nitrate (0.08 g Rh per 100 ml) alone or with the nitrate of copper, nickel or cobalt (3–4 g of hydrated nitrate per liter and a fifth sample (L) with the nickel nitrate solution alone. The impregnated rings were dried at 50° C. overnight and calcined at 450° C. for 1 hour. Their metal contents, calculated as ppm w/w of metal in the coating, are indicated at the head of the Table showing test behaviour. They constitute catalyst precursors according to the invention: they were tested by the procedure of Example 1 with catalyst temperatures at successive levels between 550° and 760° C. After this test each catalyst steamed at 760° C. for 16 hours and then re-tested in the same way. From the results, shown in Table 6, it is evident that addition of copper, or to a greater extent nickel or cobalt, increases the initial activity of rhodium, even though the activity of nickel alone is negligible. After steaming, however, the activity of the rhodium/nickel and rhodium/cobalt catalysts is much greater than it was before steaming and than that of any other of the catalysts tested.

Although none of the catalysts tested is active enough to produce a normally acceptable approach to equilibrium in the test conditions, the results appear to show that the non-noble metal (especially Ni or Co) could increase the activity of rhodium sufficiently to make the precious metal catalyst economically practicable: even a 100-fold increase of metal content would result in only 0.3 g of rhodium per liter of catalyst-filled reactor space.

(b) To explore the effect of higher metal contents, two further catalysts (M, N) were made by the same procedure. The alumina content of the support was 7.5%, and the catalyst precursors contained 200 ppm w/w respectively of NiO and CoO and 15 ppm w/w of rhodium, calculated on the total including primary support. The test procedure differed in that each precursor was treated overnight with the steam/gas mixture at 760° C. before the activity test. Hence Table 6 quotes only "steamed" data. A good approach to equilibrium (methane content 2.2, 0.7 and 0.2% at 650, 700 and 760° C.) was evidently obtained.

TABLE 6

| | | Outlet methane contents | | | | | |
|---|---|---|---|---|---|---|---|
| | | | | Catalyst | | | |
| | | H | I | J | K | L | M | N |
| | | | | Metal content* ppm w/w | | | |
| | | | Rh 120 | Rh 120 | Rh 120 | | Rh 200 | Rh 200 |
| Temp °C. | | Rh 120 | Cu 120 | Ni 120 | Co 120 | Ni 120 | Ni 2600 | Co 2600 |
| 550 | initial | 88.9 | 83.8 | 58.9 | 71.4 | 90.0 | — | — |
| | steamed | 60.4 | 82.4 | 34.8 | 39.2 | 89.3 | 24.6 | 28.0 |
| 600 | initial | 86.5 | 81.1 | 57.6 | 71.4 | 90.0 | — | — |
| | steamed | 50.9 | 76.6 | 21.8 | 25.4 | 89.3 | 13.7 | 15.0 |
| 650 | initial | 79.7 | 74.1 | 72.1 | 75.9 | 90.7 | — | — |
| | steamed | 58.2 | 67.7 | 12.2 | 13.7 | 89.3 | 5.3 | 7.6 |
| 700 | initial | 59.2 | 54.7 | 56.6 | 51.1 | 90.3 | — | — |
| | steamed | 67.3 | 70.8 | 7.6 | 7.5 | 88.3 | 2.4 | 3.5 |
| 760 | initial | 36.0 | 34.6 | 26.8 | 27.8 | 90.0 | — | — |
| | steamed | 33.8 | 45.8 | 7.3 | 8.2 | 87.6 | 1.5 | 1.8+ |

*calculated on secondary support
° 751° C.
+ 740° C.

EXAMPLE 5

Random-packed "PALL" rings (catalyst O)

The rings used were similar to those of Example 1 except for a geometric surface of 319 m² per m³. They were pretreated as in Example 1 and then washcoated with this composition:
böhmite (BACO Cerasol-RTM): 115 kg alpha alumina trihydrate
(Ramsden RC66): 87 kg
cerous nitrate hexahydrate: 2 kg
"NATRASOL" RTM hydroxyethyl cellulose 250H: 4 kg
water to total volume: 660 l Note: the böhmite had these properties:
Composition:
$Al_2O_3$: 82
$H_2O$: 17
$N_2O$: 0.12
$SiO_2$: 0.01
$Fe_2O_3$: 0.02
Crystallite size: about 500 Angstrom units
Crystal structure: böhmite
Helium density: 2.92 g ml$^{-1}$
Hg density: 1.75 g ml$^{-1}$
pore volume: 0.23 ml g$^{-1}$ The composition was made up and applied as in Example 1. The % weight increase was 8.7.

Impregnation the alumina-coated rings were dipped in a nickel nitrate solution (20 g Ni per 100 ml) for 20 minutes, allowed to drain for 20 minutes, dried at 80° C. and then calcined at 475° C. for 4 hours. These operations were repeated 3 times. The % weight increase due to NiO was 5.4, calculated on the total of rings, coating and NiO. The impregnated rings were then impregnated with a rhodium nitrate solution (1.25 g Rh per 100 g of solution) and calcined at 200° C. The rhodium content calculated as metal was 0.01% w/w on the total catalyst.

Steam-methane reforming

The nickel-rhodium-alumina carrying rings were charged to one radiatively heated tubular reactor of a primary reformer producing raw ammonia synthesis gas in the following conditions:
pressure, bar abs: 32
steam ratio by mols: 4.0
natural gas composition: % v/v: 93.6 $CH_4$, 4.8 $C_2H_6$, 0.4 $C_3H_8$ 0.75 $N_2$, 0.45 $CO_2$ After 7 days' operation the flow rate and outlet gas composition from the tubular reactor charged with this catalyst were compared with the average for the other tubular reactors of the reformer, which contained a commercially available steam reforming catalyst in the form of ceramic rings 17×17 mm, 5 mm wall thickness carrying 10.5% w/w of nickel (as NiO). The results are shown in Table 7.

TABLE 7

| | Invention | Commercial |
|---|---|---|
| Total outlet flow rate m³ h$^{-1}$ | 910* | 760 |
| Mass throughput t m$^{-3}$ h$^{-1}$ | 6.01 | 5.02 |
| Outlet methane % v/v (dry basis) | 11.2 | 10 |
| Outlet temperature °C. | 744 | 766 |
| Tube wall temperature °C. | | |
| upper | 837 | 870 |
| lower | 834 | 840 |

*Controlled at this level by flow restriction.

After 160 days' operation the methane content was 11.2% with an outlet flow rate of 920 m³ h$^{-1}$ and an outlet temperature of 745° C. At 300 days with a flow rate of 980 m³ h$^{-1}$ (temperature 705° C.) the methane content was 14% v/v. At 328 days with a flow rate of 880 m³ h$^{-1}$ (temperature 759° C.) the methane content was 8.4% v/v. It is evident that over this period the catalyst has maintained its activity. The approach to equilibrium is under 10° C.

EXAMPLE 6

Ordered charge of "PALL" ring supported catalyst (P)

Five "PALL" rings of diameter and height 50 mm were used, having the following properties
Material: Type 304 stainless steel, thickness 0.5 mm
Weight: 45.1 g average
Geometric surface:
0.0081 m² per ring
105 m² per m³ when stacked vertically in close-fitting shell such that its external surface was not in contact with reactants.

Detailed shape: apertures: 2 rows, each aperture 2 cm wide, 1.2 cm high, internal tongues corresponding to apertures.

Bulk density: 0.50 g cm$^{-3}$ when stacked vertically in close-fitting shell.

These were pre-treated and wash-coated as in Example 1 and then impregnated with nickel nitrate but not rhodium nitrate. The resulting catalyst precursor contained 6.8% w/w of $Al_2O_3$ and 4.3% w/w of NiO. The precursor rings were placed one above the other in a 50 mm internal diameter externally heated tubular reactor of a laboratory primary reformer unit: the walls of the rings fitting the tubular reactor walls closely, thus preventing contact of the reactants with catalyst on the outer walls of the rings. The test conditions were as in Example 1, with catalyst temperatures successively between 600° and 760° C. In the product gases the unreacted methane contents as shown in Table 8.

TABLE 8

| Temperature °C. | Methane content % v/v (dry basis) | |
|---|---|---|
| | Catalyst P | Equilibrium |
| 600 | 14.7 | 6.0 |
| 653 | 8.8 | 2.2 |
| 698 | 5.3 | 0.7 |
| 760 | 4.0 | 1.7 |

In view of the small geometric surface of the catalyst and the very small quantity of active metal per unit volume of the reactor, the extent of reaction is remarkably high. If the reacting gas had access to the tubular reactor wall and ring exterior surface, conversion of methane would evidently have been still higher.

EXAMPLE 7

Comparison of activity of catalysts supported on small honeycombs and "PALL" rings The methanol synthesis gas generation described in Example 2 was carried out using two types of small honeycomb catalyst and two, slightly differing, charges of "PALL" ring catalyst. The catalyst descriptions and process outlet methane contents obtained at intended equal through-put over a period are set out in Table 9.

TABLE 9

| | 7A | 7B | 7C | 7D |
|---|---|---|---|---|
| Catalyst Support | "Fecralloy" steel honeycomb 17 mm high 17 mm dia. | Stainless steel honeycomb 17 mm high 17 mm dia. | "PALL" rings 16 × 16 mm | "PALL" rings 16 × 16 mm |
| Bulk density g cm$^{-3}$ | 0.79 | 0.92 | 0.57 | 0.64 |
| Geometric surface, m$^{-1}$ | 2500 | 1400 | 319 | 319 |
| NiO % w/w | 20.2 | 18.4 | 5.4 | 5.1 |
| $Al_2O_3$ % w/w | 8.0 | 9.1 | 8.7 | 4.1 |
| $CH_4$ % v/v, day no | | | | |
| 17 | — | 3.4 | 0.8 | 1.9 |
| 20 | 1.9 | — | — | — |
| 30 | — | — | — | 2.1 |
| 52 | — | — | 1.7 | — |
| 54 | 5.4 | 3.5 | — | — |
| 59 | — | — | — | 2.7 |
| 69 | 4.2 | — | — | — |
| 72 | — | 3.4 | 1.7 | — |
| 88 | — | — | 1.4 | — |
| 92 | 3.3 | 1.5 | — | — |
| 148 | 5.0 | — | — | — |
| 150 | — | 2.9 | 2.8 | — |
| 190 | 4.4 | — | 2.2 | — |
| 192 | — | 1.4 | — | — |

It is evident that despite its lower geometric surface and NiO content (lower per catalyst unit, much lower per unit volume of reactor space) tha two catalysts supported on "PALL" rings have produced a gas generally lower in methane content than the two honeycomb catalysts.

EXAMPLE 8

Catalyst (Q) supported on Lessing rings

A batch (150 g) of the Lessing rings described in the paragraph preceding Example 1 was degreased using acetone and heated in air at 600° C. for 4 hours, then cooled and immersed in a washcoat mixture having the following composition:
Böhmite (BACO Cerasol-RTM): 224 g
Alpha alumina trihydrate (Ramsden RC66): 175 g
Cerous nitrate hexahydrate: 4.2 g
"NATRASOL": 9.4 g
water: to 1300 ml After 20 minutes they were allowed to drain, then dried at 60° C. and calcined at 700° C. for 2 hours. This immersion, drying and calcination procedure was repeated twice. The coated rings were impregnated with nickel oxide by the procedure described in Example 1. The gain in weight of the rings was 2.37% $Al_2O_3$ and 1.3% NiO: thus, however, represents (owing to the thicker metal of the Lessing rings) about the same quantity of nickel oxide per unit volume of reactor space as when using the "PALL" rings.

The coated rings were tested as described in Example 1. (Note: the metal of the rings used was unnecessarily thick. In industrial practice the metal thickness would be about the same as for the "PALL" rings, with evident consequences for the gain in weight and for bulk density and open area).

TABLE 10

| | Percentage outlet methane v/v, dry basis | |
|---|---|---|
| Temperature °C. | initially | after 16 h steaming |
| 607 | 12.5 | (18.9) |
| 650 | 8.1 | 8.3 |

TABLE 10-continued

| Temperature °C. | Percentage outlet methane v/v, dry basis | |
| --- | --- | --- |
| | initially | after 16 h steaming |
| 703 | 3.0 | 4.0 |
| 765 | 1.7 | 2.1 (at 760° C.) |

I claim:

1. A process for producing a gas containing at least 30% v/v of hydrogen on a dry basis which comprises reacting a hydrocarbon feedstock boiling at up to 220° C. with steam and/or carbon dioxide at a (steam+$CO_2$) to carbon molar ratio in the range 2.0 to 8.0 over a catalyst at a temperature in the range 600°–1050° C., said catalyst being randomly disposed in an externally heated tubular reactor as undeformable tube-shaped hollow units each permitting through gas flows in at least two mutually transverse directions within its boundaries by way of apertures in its wall, said apertures being at least 1 mm wide in their smallest dimension and internal vanes corresponding in shape and size to said apertures, each such unit being made structurally of a metal or alloy constituting the catalyst primary support and carrying a coating of adsorptive material constituting the catalyst secondary support in which nickel or cobalt is present to the extent of 30 to 60% w/w calculated as monoxide on the total coating.

2. A process according to claim 1 in which the catalyst provides a geometric surface in the range 200–400 $m^{-1}$.

3. A process according to claim 2 to produce ammonia synthesis gas and operated in these conditions:
   outlet temperature: 700°–850° C.
   outlet pressure: 25–40 bar abs.
   steam to carbon molar ratio: 3.3–4.5
   outlet methane content 8–16% v/v (dry basis)
   approach to equilibrium 0°–20° C.
   mass throughput over 5.0 t $h^{-1}$ $m^{-3}$ of heated catalyst.

4. A process according to claim 2 to produce methanol synthesis gas and operated in these conditions:
   outlet temperature: 780°–900° C.
   outlet pressure: 10–30 bar abs.
   steam to carbon molar ratio ("steam" includes any $CO_2$): 3–6
   outlet methane content: up to 5% w/w
   approach to equilibrium: up to 10° C.
   mass throughput: over 1.5 t $h^{-1}$ $m^{-3}$ of heated catalyst.

* * * * *